Dec. 11, 1934.  E. ANDERSON ET AL  1,983,651

RULE

Filed April 19, 1930

Inventors
CARL M. NICHOLSON &
EMIL ANDERSON
By their Attorney
Fred Francis Weiss Patented Dec. 11, 1934

1,983,651

UNITED STATES PATENT OFFICE 1,983,651

RULE

Emil Anderson, Briarcliffe, and Carl M. Nicholson, Ossining, N. Y.

Application April 19, 1930, Serial No. 445,547

5 Claims. (Cl. 33—115)

This invention relates to the provision of a novel joint structure for use in connection with folding rules.

One of the objects of this invention is the provision of a novel joint structure for use in connection with folding rules to secure the various parts thereof together at predetermined and prechosen angularity with respect to each other.

Another object of this invention is the provision of a novel securing structure adapted to secure the various parts of a folding rule together and embodying means whereby the said various parts may be fixedly carried at predetermined angularity with respect to each other after a proper setting at a prechosen angle.

A still further object of this invention is the provision of a novel locking joint for foldable rule elements whereby the respective elements may be locked both against unfolding and in prechosen fixed angular relation with respect to each other.

Various other objects and advantages of the invention than those hereinabove mentioned will appear more fully hereinafter. It is to be understood, that the specific forms shown are merely illustrative and hence the detailed description thereof is not to be taken as limiting the invention itself.

The invention resides substantially in the combination, construction, location and relative arrangement of parts all as will be more fully pointed out hereinafter.

Referring to the drawing.

Like numerals refer to similar parts throughout the several views.

In the art of manufacturing folding rules of types current in present day use it has been found desirable to create a foldable carpenter's rule adapted to unfold to yield a rule of some three foot length or so when in completely unfolded position, and to include therewith some manner of means whereby one or a number of the elements going to make up the composite rule may be angularly set with respect to the other elements. The provision of some method or means in the locking joint elements whereby such angular setting may be accomplished is desirable, as we believe to be quite obvious, to aid the user of the rule to quickly and accurately lay off lengths at an accurate angle with respect to the length of the body of the rule, in locations where structural demands require various angularly joined joints. Although various types of rules have been conceived of, to our knowledge, no single one of them has had incorporated therein a structure for locking the various rule elements together which structure contains means for angularly fixedly setting one element with respect to the other. It is the purpose of this invention to provide a desirable structure accomplishing the ends heretofore recited.

Figure 1:
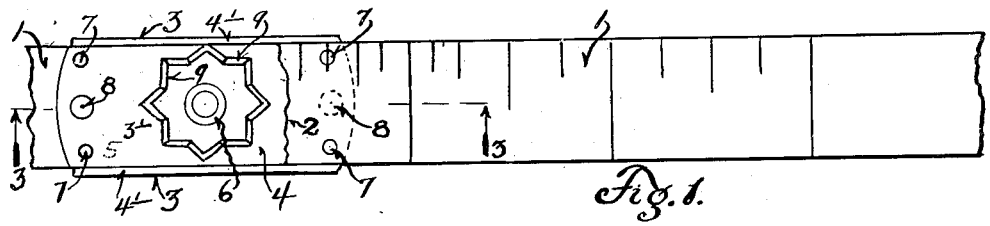
Figure 1 is an elevational view of a portion of a rule showing our novel joint.
Figure 2:
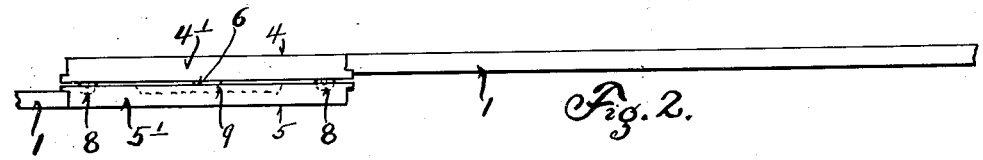
Fig. 2 is a bottom plan view of the structure shown in Fig. 1.
Figure 3:
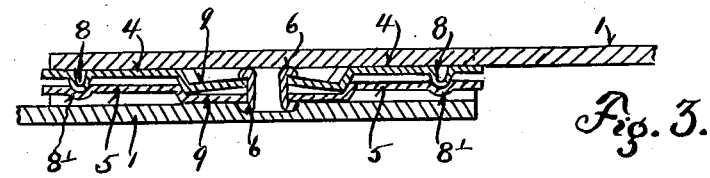
Fig. 3 is a sectional view taken along the line 3—3 in Fig. 1.

Referring particularly to the figures it will be noted that in Figs. 1 and 2 we have shown portions of our graduated rule elements 1. It will be noted that the right hand element 1 is broken away at 2 so as to expose the joint, generally indicated at 3, securing the respective elements 1 together. As will be observed in Fig. 2, this joint comprises two elements 4 and 5 secured together by a rivet 6. Each of elements 4 and 5 consists in a body element 3' having two flanges 4' and 5' at right angles with respect thereto. At either end of each body element 3' are raised projections 7 adapted to cut into and secure the respective rule elements to their corresponding joint body elements. As will be noted in Fig. 1 there are also carried at either end of the body elements 3' the projections 8 facing in both elements 3' in the same direction so that there is formed at the faces where the respective body elements contact with each other a lock-joint effect. Thus the raised projections 8 on what corresponds in Fig. 3 to the upper body element 3' seat into the cavities formed by creating the projections 8' on what corresponds to the lower body element 3' to attain a dove-tail, or what might be termed a male-female locking effect, tending to hold the two elements 3' in fixed relation one with respect to the other so that their respective flanges 4' and 5' lie in substantially the same plane with the corresponding flanges of the other joint body element. Similarly impressed in the upper plate will be noticed the polygonal star-like impression 9, the raised portion of which faces in a direction substantially parallel to the direction of the raised lugs 8. The other body element is similarly impressed with a corresponding star-like portion in which the first mentioned portion may seat (see Fig. 3). It will be noted that although one star-like portion is adapted to seat within the other, we have shown the contact between portions to exist only at the edges thereof and not along the bottom of the impressions. By bending the bottom of the impression 9 in the upper plate slightly upwards the frictional holding effect between impressions is moderated and a springiness is given to the structure. As will be clear the rotation of one of the body elements 3' with respect to the other against the holding action of the raised lugs 8 and against the frictional holding effect caused by star-like impressions tending to seat one within the other provides a structure wherein it is possible to rotate the respective rule elements through a prechosen, predetermined and pre-evaluated angular displacement and lock the same in the new position. Roughly, as is shown in Fig. 1, the rotation of one body element 3' with respect to the other, using the combination star formed by the intersection of the sides of two squares having a common center point and displaced 45° with respect to each other, yields a locking-joint structure wherein it is possible to fixedly set one joint body element 3' with respect to the other at various fixed angles such as 0°, 45°, 90°, 135° and 180°. Aside from this it is quite obvious, that by embodying in each body element 3' various other polygonal configurations or impressions it is possible to get a multitude of various types of setting devices so that various angular settings may be obtained by the proper choice of plate impression.

Figure 4:
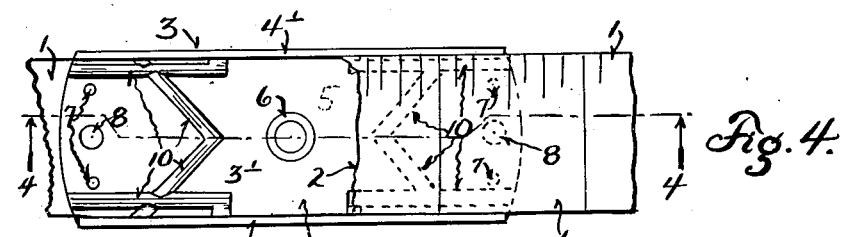
Fig. 4 is a view similar to Fig. 1 showing a variant possible embodiment.

Referring now to Fig. 4 it will be seen that aside from the elements heretofore recited we have shown a new method of locking the respective body plates 3' at pre-chosen angles by ribbing the same with raised and impressed ribs 10 at right angles to each other as well as at pre-chosen angles with respect to each other. For example, as shown in Fig. 4 we show ribs both at 90° with respect to each other and at 45°. The rotation therefore of one body element with respect to the other on rivet 6 as the pivot, will interlock the parts when displaced 45° and the rule lengths will be fixedly set at the fixed angles as above noted.

Figure 5:
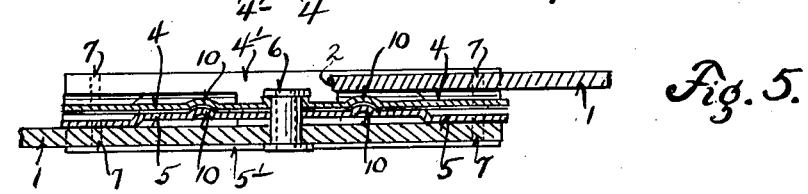
Fig. 5 is a sectional view taken along the line 4—4 in Fig. 4.

In the configuration therefor of Figures 4 and 5 the star points formed by ribs 10, 10, are disposed at right angles in points on the mid-portion of the plate opposite the pivot joint 6. These rib portions each meet a rib portion at an angle of 45° which rib portions lie parallel to the edges of the plate. This arrangement permits pivoted displacement at definite angles which, in this instance are angles of 45°, 90° and 135°. It is, of course, obvious to those skilled in the art that various other possible embodiments than those above may be conceived of whereby various angular settings can be obtained and the rules held at such settings. Wherefore we desire that the particular examples that we have heretofore given be taken as merely illustrative and not at all as limiting the scope of this invention. Further than this we do not desire to be limited further than by the claims which are appended hereto.

What we claim for United States Letters Patent is:

1. In a folding rule substantially of the type described, a plurality of rule elements, a metal joint element secured to the end of each of said rule elements, flanges carried by said metal joint elements, a plurality of projections carried by each of said joint elements to secure said joint elements to said rule elements, means for securing two of said joint elements together, raised projections for holding said joint elements with their flanges substantially in the same plane, and raised and impressed star-like configurations formed in said metal joint elements for holding said joint elements in fixed angular relation when their flanges are not held substantially in the same plane.

2. In a folding rule substantially of the type described, a plurality of rule elements, a metal joint secured to the end of each of said rule elements, flanges carried by said metal joint elements, a plurality of projections carried by each of said joint elements to secure said joint elements to said rule elements, means for securing two of said joint elements together, raised projections for holding said joint elements with their flanges substantially in the same plane, and a plurality of connected circularly grouped rib-like projections and depressions formed in said metal joint elements for holding said joint elements in fixed angular relation intermediate their open and closed positions.

3. A connection for the members of an extension rule, consisting of two plates, means for pivotally securing the plates together, means carried by said plates for holding them in registry with respect to each other, means on said plates for securing thereto rule elements, and further means including raised and impressed star-like configurations formed in said plates for holding said plates in fixed angular relations with respect to each other.

4. A connection for the members of an extension rule, consisting of two plates, means for pivotally securing the plates together, means carried by said plates for holding them in registry with respect to each other, means on said plates for securing thereto rule elements, and further means including a plurality of raised and impressed connected ribs angularly disposed in zig-zag formation in said metal joint elements for holding locked said joint elements in fixed angular relation intermediate their open and closed positions when their flanges are not held substantially in the same plane.

5. A connection for the members of an extension rule, consisting of a plate, said plate being provided with a star-like pocket intermediate the side edges thereof, a second plate provided with a similar star-like projection adapted to engage the pocket in the first named plate, and means to pivotally secure the plates together.

EMIL ANDERSON.
CARL M. NICHOLSON.